United States Patent [19]

Hanson et al.

[11] 4,424,341
[45] Jan. 3, 1984

[54] SEPARATION OF SOLID POLYMERS AND LIQUID DILUENT

[75] Inventors: Donald O. Hanson; Fred T. Sherk, both of Bartlesville, Okla.

[73] Assignee: Phillips Petroleum Company, Bartlesville, Okla.

[21] Appl. No.: 304,235

[22] Filed: Sep. 21, 1981

[51] Int. Cl.$^3$ .............................................. C08F 6/10
[52] U.S. Cl. .................................. 528/501; 528/502; 528/503
[58] Field of Search ........................................ 528/501

[56] References Cited

U.S. PATENT DOCUMENTS

| | | | |
|---|---|---|---|
| 2,943,082 | 6/1960 | Cottle | 528/501 |
| 2,949,447 | 8/1960 | Hawkins | 528/501 |
| 2,952,671 | 9/1960 | Cottle | 528/501 |
| 3,594,356 | 7/1971 | Hinton | 528/501 |
| 3,625,932 | 12/1971 | Green | 528/501 |

*Primary Examiner*—C. A. Henderson

[57] ABSTRACT

A novel process is disclosed for separating liquid diluent from a slurry of the diluent and a solid polymer involving the use of a first intermediate pressure flash zone and a second lower pressure flash zone.

4 Claims, 1 Drawing Figure

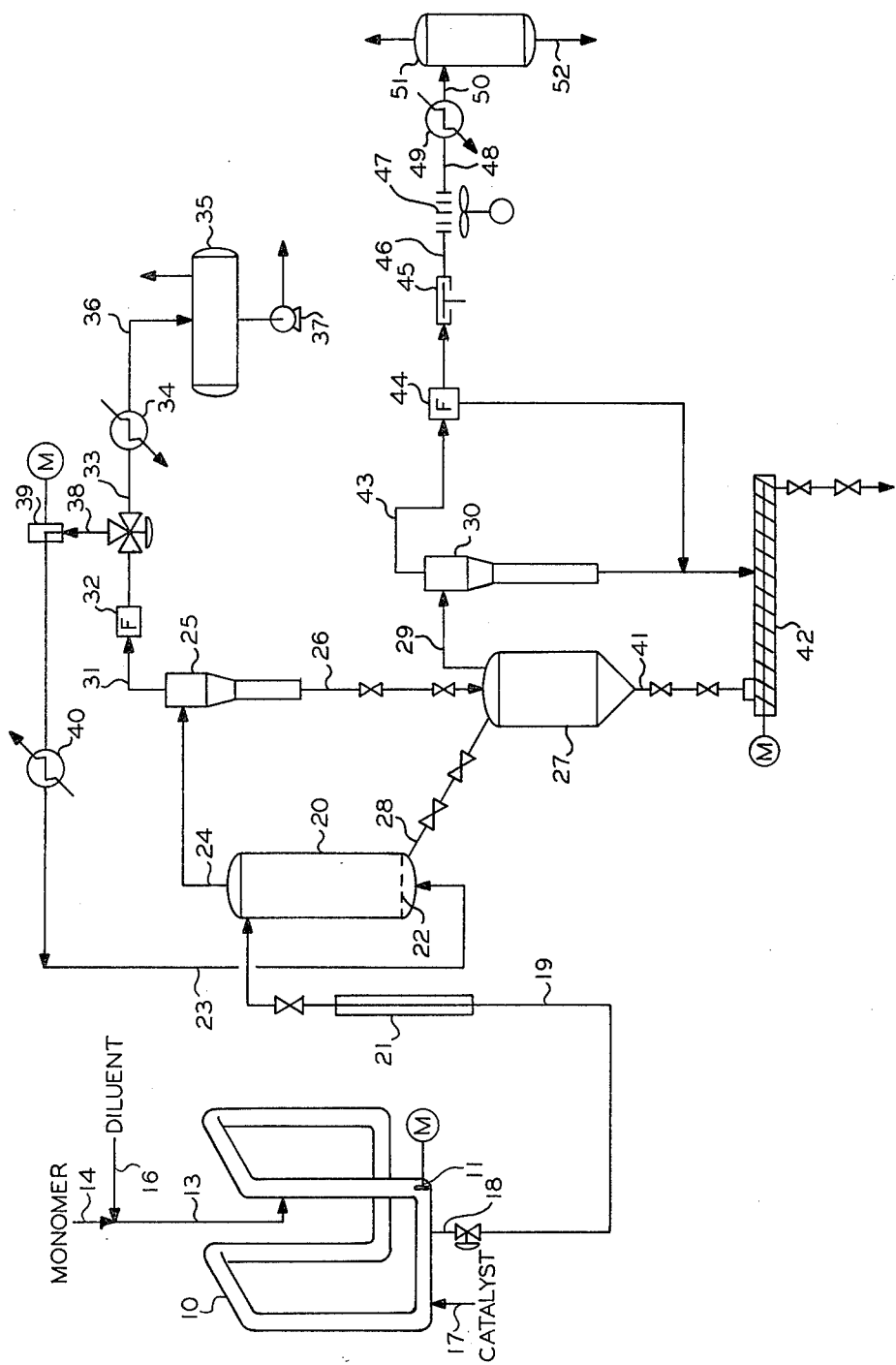

SEPARATION OF SOLID POLYMERS AND LIQUID DILUENT

BACKGROUND OF THE INVENTION

The present invention relates to a method for separating solid polymer and liquid diluent from a mixture of those materials. In another aspect, the invention relates to a method for separating solid polymer from liquid diluent, drying the polymer, and recovering the diluent for reuse in a polymerization process.

In many polymerization processes for the production of normally solid polymer, a stream is formed which is a slurry of particulate polymer solids suspended in a liquid medium, ordinarily the reaction diluent. Typical examples of such processes are disclosed in Hogan and Bank's U.S. Pat. No. 2,285,721 and in G. T. Leatherman and C. V. Detter's U.S. patent application Ser. No. 590,567, filed June 11, 1956, and now abandoned. The disclosure of that patent and that application are incorporated herein by reference. While the polymerization processes described in those documents employ a catalyst comprising chromium oxide and a support, the present invention is applicable to any process producing an effluent comprising a slurry of particulate polymer solids suspended in liquid diluent. Such reaction processes include those which have come to be known in the art as particle form polymerizations.

In most commercial scale operations, it is desirable to separate the polymer and the diluent in such a manner that the diluent is not exposed to contamination so that it can be recycled to the polymerization zone with minimal if any purification. A particularly favored technique that has been used heretofore is that disclosed in the Scoggin et al, U.S. Pat. No. 3,152,872, more particularly the embodiment illustrated in conjunction with FIG. 2 of that patent. In such processes the reaction diluent, dissolved monomers, and catalyst are circulated in a loop reactor. The produced solid polymer is also circulated in the reactor. A slurry of polymer and diluent is collected in one or more settling legs from which it is discharged to a flash chamber wherein the mixture is flashed to a low pressure such as about 20 psia. While the flashing results in substantially complete removal of the diluent from the polymer, it is necessary to recompress the vaporized diluent in order to be able to condense it to a liquid suitable for recycling to the polymerization zone. The cost of compression equipment and the utilities required for its operation often amounts to a significant portion of the expense involved in producing polymer.

An object of the present invention is to provide a method for separating the solid polymer and the diluent in a manner that reduces the need for compression of diluent.

Other aspects, objects, and advantages of the present invention will be apparent from the following disclosure and the FIG. 1.

BRIEF SUMMARY OF THE INVENTION

In accordance with the present invention, there is provided a method for recovering polymer solids from a polymerization effluent comprising a slurry of said polymer solids in a liquid diluent. The method comprises heating the effluent and vaporizing diluent in said heated effluent by exposing the heated effluent to a pressure drop in a first flash step. The pressure and temperature of the heated effluent in the first flash step are such that a major amount of the diluent will be vaporized and said vapor can be condensed without compression by heat exchange with a fluid having a temperature in the range of about 40° F. to about 130° F. The diluent vapor is separated from the polymer solids and then condensed without compression by heat exchange with a fluid having a temperature in the range of about 40° F. to about 130° F. The polymer solids from the first flash step are then subjected to a lower pressure flash step to vaporize additional remaining diluent, and the diluent vapor and polymer solids are separated.

BRIEF DESCRIPTION OF THE DRAWING

FIG. 1 is a schematic diagram illustrating a process for separating polymer from diluent in accordance with the present invention.

DETAILED DESCRIPTION OF THE INVENTION

While the present invention is applicable to any mixture which comprises a slurry of polymer solid and diluent, it is particularly applicable to the slurries resulting from olefin polymerizations. The olefin monomers generally employed in such reactions are 1-olefins having up to 8 carbon atoms per molecule and no branching nearer the double bond than the 4-position. Typical examples include ethylene, propylene, butene-1, 1-pentene, and 1,3-butadiene.

Typical diluents employed in such olefin polymerizations include hydrocarbons having 3 to 12, preferably 3 to 8 carbon atoms per molecule, such as propane, propylene, n-butane, n-pentane, isopentane, n-hexane, toluene, isooctane, isobutane, 1-butene, and the like. In some cases, naphthene hydrocarbons having 5 to 6 carbon atoms in the naphthenic ring are also used. Examples of such naphthenic hydrocarbons include cyclohexane, cyclopentane, methylcyclopentane, ethylcyclohexane, and the like.

The temperature to which the slurry is heated for vaporization will vary of course depending upon the nature of the diluent, the nature of the polymer, and the temperature of the heat exchange fluid that is used to condense the vaporized diluent. Obviously, the temperature must be raised above the dew point of the diluent at the flashing pressure. Further the temperature should be below that of the melting point of the polymer to preclude accumulation of polymer in the process vessels and to preclude agglomeration of the polymer particles.

The pressure for the first flash step will likewise vary depending upon the nature of the diluent and the temperature selected. Typically, pressures in the range of about 30 to about 300 psia can be employed, preferably about 150 to 250 psia.

The heat exchanging fluid used to condense the vapor from the first flash step is, as indicated above, at a temperature in the range of about 40° F. to 130° F. A particularly preferred embodiment uses a heat exchange fluid at a temperature of moderate ambient conditions, for example, temperatures in the range of 60° to 100° F., more preferably 86° to 96° F.

A further understanding of the present invention will be provided by referring to FIG. 1 which illustrates a system comprising an embodiment of the invention.

In the embodiment illustrated in FIG. 1, the polymerization is carried out in a loop reactor 10. The polymerization mixture is circulated by agitator 11. Monomer and diluent are introduced through conduits 14 and 16, respectively, connected to conduit 13. Catalyst is added through conduit 17. Normally catalyst is introduced as a suspension in a hydrocarbon diluent.

Polymer slurry is removed from the loop to a settling leg 18. The slurry passes from settling leg 18 to conduit 19 and into flash chamber 20. Conduit 19 has an indirect heat exchange means such as a flash line heater 21. The flash chamber 20 as illustrated includes in its lower end a gas distribution plate 22. Heated diluent vapor provided via conduit 23 is passed into the flash chamber 20 and through the distributor plate 22 in such a fashion as to cause a fluidized bed of polymer solids to occur in the flash chamber.

Vaporized diluent exits the flash chamber 20 via conduit 24 through which it is passed into a cyclone 25 which separates entrained polymer particles from the vapor. Polymer particles separated by the cyclone are passed via line 26 to a lower pressure flash chamber 27.

The polymer particles in the fluidized bed are withdrawn via conduit 28 and also passed into the lower pressure flash chamber 27. In flash chamber 27 substantially all the diluent still associated with the polymer is vaporized and taken overhead via conduit 29 to a second cyclone 30.

The major portion of the diluent associated with the polymer solids as they leave settling leg 18 will have been taken to cyclone 25 as vapor via conduit 24. The vapor after having a substantial part of any entrained solids removed is passed via line 31 through a filter capable of removing any remaining polymer fines. The vapor stream is then split. One portion is passed via conduit 33 through a heat exchanger 34 wherein the vapor is condensed by indirect heat exchange with a heat exchange fluid. The condensed diluent is then passed to an accumulator 35 via conduit 36. Any uncondensed vapors and gases can be removed overhead from the accumulaor 35. A pump 37 is provided for conveying the condensed diluent back to the polymerization zone.

The other portion of the diluent vapor is passed via line 38 through a blower 39 which forces the vapor into conduit 23 to provide at least part of the diluent vapor needed to provide the fluidized bed in flash chamber 20. The vapor that is passed into conduit 23 is first passed through a heat exchange zone 40 wherein the vapor is heated if desired to provide part or all of the heat needed for heating the polymer slurry provided by conduit 19.

The polymer solids in the lower pressure flash tank are passed via line 41 to a conventional conveyor dryer 42 from which the polymer can be packaged or otherwise handled while in contact with the atmosphere.

The vapors exit the secondary cyclone 30 via line 43 to a filter 44 such as a bag filter capable of removing any substantial amounts of polymer fines. The filter vapor is then passed to a compressor 45 and the compressed vapors are passed through conduit 46 to an air-fin cooler 47 wherein a portion of the compressed vapors are condensed. The remaining vapors are passed through conduit 48 to a condenser 49 where most of the remaining vapors are condensed and the condensate is passed through conduit 50 to knockout drum 51 or a fractionator. The condensed diluent can then be removed via conduit 52 and recycled to the polymerization process. Since the major portion of the diluent is recovered from the intermediate pressure flash chamber, the load on compressor 45 is much lower than in prior art techniques of the type illustrated in U.S. Pat. No. 3,152,872.

It is important to note that there are many variations of the illustrated embodiment which fall within the scope of the present invention. For example, it is within the scope of the present invention to eliminate the flash line heater 21 and to have all the heat supplied by the heated diluent vapor that is used to provide a fluidized bed in flash chamber 20. Further, in some instances, it may be desirable to have the cyclone 25 actually present in the flash chamber rather than being connected to it by a conduit. Still further, it is within the scope of the present invention to eliminate the fluidized bed concept and to supply all the heat needed by other means such as the flash line heater 21. In such a modification, there obviously would no longer be a need for the gas distributor plate 22.

It is noted that when recycled diluent vapor from the first flash step is used as the fluidizing medium in the first flash step, it can sometimes lead to alterations in the properties of the polymer since it often will contain monomer that could react in the flash step. Under such circumstances, it is thus preferred to use a substantially pure heated diluent as the fluidizing medium or to eliminate the fluidized bed concept and use flash line heaters to provide all the necessary heat.

In regard to embodiments employing the fluidized bed concept, experiments were conducted to determine the conditions that would be most suitable for producing a fluidized bed of the polymer particles. The particles employed were polyethylene particles having sphericities in the range of about 0.55 to 0.60 as determined by the Ergun equation as disclosed in Zenz, F. and D. Othmer, *Fluidization and Fluid-Particle Systems*, New York; Reinhold, 1960, p. 75. The Ergun equation is $$\frac{\Delta P}{L} gc = \frac{150 (1 - Em)^2}{Em^3} \frac{\mu U_o}{(\phi dp)^2}$$

where:
$\Delta P$ = pressure drop over the bed length.
L = bed length.
gc = dimensional constant when units of force such as lbs-force or Kg-force are used.
Em = porosity of packed bed.
$\mu$ = viscosity of flowing gas.
$U_o$ = gas superficial velocity (based on bed cross-sectional area).
$\phi_s$ = sphericity of the particles.
dp = mean particle diameter for mixture.

For the polyethylene fluff particles having sphericities in the range of about 0.55 to 0.60, it was determined that good fluidization was obtained with the superficial velocity of the fluidizing gas being in the range of about 0.4 to 0.8 ft/sec. It was further noted that slugging of the bed was a problem when the height of the bed was allowed to be more than about 3 times its diameter. Generally, it would be preferable for the bed height to be no greater than two times its diameter.

The preferred bed diameter and rate of feeding such a polymer slurry can be calculated by the formula:

$$t = \frac{750 \pi D^3}{W}$$

where:

t = Residence time in minutes necessary for desired level of diluent separation.
D = Bed diameter, ft.
W = Fluff feed rate, lb/hr.

Rate data obtained during measurement of equilibrium isobutane absorption on polymer fluff indicated that 2 to 3 minutes should be adequate for such polyethylene fluff. Thus, for a pilot plant scale process producing 22 pounds per hour of fluff, a bed diameter of at least about 4 inch would be preferred. For a commercial process producing 17,500 pounds of fluff per hour, a bed diameter of at least about 4 feet would be preferred. Residence times greater than 10 minutes generally should not be necessary.

The following example sets forth typical conditions that can be used in a commercial scale process in employing the present invention.

EXAMPLE

A typical ethylene homopolymerization process would be the polymerization conducted at a temperature of about 650 psia and a pressure of about 225° F. The settling leg would be operated to accumulate and discharge about 55 weight percent solids. An example of such a process would result in a polymer slurry product containing about 17,500 pounds per hour of polyethylene and about 14,318 pounds per hour of isobutane diluent. This slurry would then be flashed to 180 psia and 180° F. to vaporize the major portion of the diluent. The auxiliary heat necessary to cause the effluent to be at 180° F. after the pressure drop to 180 psia can be supplied by preheating the effluent, by heating recycled fluidizing diluent, or by a combination of the two methods. About 90 percent of the diluent is taken overhead from flash zone 20 at 180 psia. Even assuming that there would be a further pressure drop between flash zone 20 and accumulator 35, the isobutane diluent could readily be condensed against 60° to 80° F. cooling water without compression. The remaining 10 percent of the diluent and the fluff are then passed into a lower pressure flash tank wherein they are exposed to a pressure in the range of about 20 to 30 psia. The diluent vapor from the lower pressure flash tank can then be condensed using compression and cooling. The use of the preliminary higher pressure tank results in a significantly lower compression load than was required in the conventional process in which slurry was immediately flashed to a pressure in the range of 20 to 30 psia.

What is claimed is:

1. A method for recovering polymer solids from an olefin polymerization effluent comprising a slurry of said solids in a liquid diluent comprising heating said effluent and vaporizing diluent in said heated effluent by exposing the heated effluent to a pressure drop in a first flash step, wherein the pressure in the first flash step and the temperature of said heated effluent are such that the major portion of the diluent will be vaporized and said vapor can be condensed without compression by heat exchange with a fluid having a temperature in the range of about 40° F. to about 130° F.; separating the diluent vapor and the polymer solids; condensing the vapors obtained in said first flash step without compression by heat exchange with a fluid having a temperature in the range of about 40° F. to about 130° F., subjecting the polymer solids recovered from said first flash step to a lower pressure flash step wherein diluent remaining with the polymer solids is vaporized, and separating the diluent vapor and polymer solids, and recycling at least part of the condensed diluent from said first flash step to the polymerization zone, wherein said first flash step is carried out in a flash vessel wherein heated recycled diluent vapor is used to heat the effluent and to maintain a fluidized bed of said polymer solids in said vessel and wherein the superficial velocity of the fluidizing heated recycled diluent vapor is in the range of about 0.4 to about 0.8 ft/sec and the fluidized bed height is no more than about two times the bed diameter.

2. A method according to claim 1 wherein the polymer solids residence time in the bed is in the range of about 2 to about 10 minutes.

3. A method according to claim 2 wherein the ratio of diluent vapor recycle to slurry feed in pounds per hour is in the range of about 1 to about 3.5.

4. A method according to claim 3 wherein said polymer solids particles have a sphericity in the range of about 0.55 to 0.6.

* * * * *